United States Patent
Sugano et al.

(10) Patent No.: US 7,059,292 B2
(45) Date of Patent: Jun. 13, 2006

(54) SEALING STRUCTURE FOR DIVIDED TYPE CYLINDER BLOCK

(75) Inventors: Minoru Sugano, Okazaki (JP); Kazunari Takenaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/020,240

(22) Filed: Dec. 27, 2004

(65) Prior Publication Data

US 2005/0151328 A1 Jul. 14, 2005

(30) Foreign Application Priority Data

Jan. 8, 2004 (JP) .............................. 2004-003188

(51) Int. Cl.
*F02F 11/00* (2006.01)
(52) U.S. Cl. .................................. 123/195 R; 277/595
(58) Field of Classification Search ............ 123/195 R, 123/193.2, 41.84, 41.72, 41.83
See application file for complete search history.

(56) References Cited

U.S. PATENT DOCUMENTS 1,285,430 A * 11/1918 Sheppy ..................... 123/41.84
2,238,404 A * 4/1941 Spencer .................... 123/41.83

FOREIGN PATENT DOCUMENTS

JP     2000-145972     5/2000

* cited by examiner

*Primary Examiner*—Henry C. Yuen
*Assistant Examiner*—Hyder Ali
(74) *Attorney, Agent, or Firm*—Kenyon & Kenyon LLP

(57) ABSTRACT

A cylinder block includes an inner block member having a cylinder liner portion and an outer block member having a cylinder outer wall portion. With the inner and outer block members assembled together, a water jacket is defined between the outer and inner circumferential surface. A first sealing surface of the cylinder liner portion is opposed to a second sealing surface of the cylinder outer wall portion below the water jacket, and a liquid gasket is provided between the first and second sealing surfaces. A continuous projection is provided on the first sealing surface. When the cylinder liner portion is inserted into the space defined by the cylinder outer wall portion, the projection prevents the gasket from being displaced to a trailing side on the cylinder liner portion with respect to the inserting direction. As a result, the clearance between the block members is sealed reliably.

8 Claims, 3 Drawing Sheets

SEALING STRUCTURE FOR DIVIDED TYPE CYLINDER BLOCK

BACKGROUND OF THE INVENTION

The present invention relates to sealing structures for divided type cylinder blocks.

Generally, water-cooled engines have a cylinder block including a water jacket defined around the cylinders for circulating coolant. As this cylinder block, a divided type cylinder block having an inner block member and an outer block member has been proposed. The inner block member defines cylinder bores and is assembled with the outer block member by inserting the inner block member into the outer block member from above. With the inner and outer block members assembled with each other, the water jacket is defined between opposing surfaces of the block members. More specifically, in the assembled state of this cylinder block, the outer circumferential surface of a lower end portion of the inner block member is located relatively close to the inner circumferential surface of the outer block member, as opposed to the inner circumferential surface of the outer block member. The clearance defined between the opposed portions of the inner and outer block members is sealed by a liquid gasket. The clearance between the block members above the sealed clearance defines the water jacket. Accordingly, for preventing coolant from leaking downward from the water jacket, for example, to the interior of the crankcase, the clearance between the opposed portions of the block members, in which the gasket is provided, must have a highly reliable sealing structure.

However, when the inner block member is inserted into the outer block member, the opposed portions of the block members are moved relative to each other along the inserting direction, while located close to each other. In this state, the gasket receives shearing force from the opposed portions and is deformed as smeared along the inserting direction. This prevents the gasket from filling the clearance between the opposed portions sufficiently. If this is the case, the clearance is not sealed reliably.

Japanese Laid-Open Patent Publication No. 2000-145972 describes a sealing structure using a liquid gasket. The sealing structure is employed in a vertically divided type crankcase. More specifically, the sealing structure is used for sealing the clearance defined by an interface (a first interface) between an upper case member and a lower case member and the clearance defined by an interface (a second interface) between the lower and upper case members and a side cover. The first interface extends perpendicular to the second interface. At the crossing section between the first and second interfaces, a recess is provided for retaining the liquid gasket. The gasket in the recess is thus supplied directly to the first and second interfaces, such that the clearance defined by the opposed portions of the upper and lower case members and the side cover is reliably sealed.

However, when inserting the upper case member into the lower case member, the upper and lower case members must be brought close to each other along a direction perpendicular to the interface between the upper and lower case members. Likewise, when the upper and lower case members are joined with the side cover, the case members must be brought close to the side cover along a direction perpendicular to the interface between the case members and the side cover. Therefore, in assembly of the crankcase, the gasket does not receive shearing force from the interfaces. In other words, the sealing structure of the aforementioned publication does not address to the problem of shearing force, which may act on the gasket disposed in the clearances defined by the interfaces when the components are assembled. Accordingly, even if the gasket receives shearing force in assembly of the crankcase, the recess for retaining the gasket cannot contribute to improvement of the sealing performance of the gasket.

SUMMARY OF THE INVENTION

Accordingly, it is an objective of the present invention to provide a divided type cylinder block capable of suppressing displacement of a liquid gasket between an inner block member and an outer block member when the block members are assembled together, such that the clearance between the block members is sealed reliably.

To achieve the foregoing and other objectives and in accordance with the purpose of the present invention, the invention provides a divided type cylinder block including an inner block member, an outer block member, a liquid gasket, and a restricting portion. The inner block member has a cylinder liner portion defining a cylinder bore. The cylinder liner portion includes an outer circumferential surface and a first sealing surface formed at a predetermined position of the outer circumferential surface. The outer block member has a cylinder outer wall portion. The cylinder outer wall portion includes an inner circumferential surface and a second sealing surface formed at a predetermined position of the inner circumferential surface. The inner block member is assembled with the outer block member by inserting the cylinder liner portion into the space defined by the cylinder outer wall portion along a predetermined inserting direction. With the inner and outer block members assembled together, a water jacket is defined between the outer circumferential surface and the inner circumferential surface and the first sealing surface is opposed to the second sealing surface below the water jacket. The liquid gasket is provided between the opposed first and second sealing surfaces. The restricting portion is formed in the first sealing surface. When the cylinder liner portion is inserted into the space defined by the cylinder outer wall portion, the restricting portion prevents the gasket from being displaced to a trailing side on the cylinder liner portion with respect to the inserting direction.

The present invention also provides a divided type cylinder block including an inner block member, an outer block member, a liquid gasket, and a restricting portion. The inner block member has a cylinder liner portion defining a cylinder bore. The cylinder liner portion includes an outer circumferential surface and a first continuous sealing surface formed at an end of the outer circumferential surface. The outer block member has a cylinder outer wall portion. The cylinder outer wall portion includes an inner circumferential surface and a second continuous sealing surface formed at an end of the inner circumferential surface. The inner block member is assembled with the outer block member by inserting the cylinder liner portion into the space defined by the cylinder outer wall portion along the axis of the cylinder bore. With the inner and outer block members assembled together, a water jacket is defined between the outer circumferential surface and the inner circumferential surface and the first sealing surface is opposed to the second sealing surface below the water jacket. The liquid gasket is provided between the opposed first and second sealing surfaces. The restricting portion is formed in the first sealing surface. When the cylinder liner portion is inserted into the space defined by the cylinder outer wall portion with the gasket applied to the first sealing surface, the restricting portion prevents the gasket from being displaced to a trailing side on the cylinder liner portion with respect to the inserting direction.

Further, the present invention provides another divided type cylinder block including an inner block member, an outer block member, a liquid gasket, and a restricting portion. The inner block member has a cylinder liner portion defining a cylinder bore. The cylinder liner portion includes an outer circumferential surface and a first sealing surface formed at a predetermined position of the outer circumferential surface. The outer block member has a cylinder outer wall portion. The cylinder outer wall portion includes an inner circumferential surface and a second sealing surface formed at a predetermined position of the inner circumferential surface. The inner block member is assembled with the outer block member by inserting the cylinder liner portion into the space defined by the cylinder outer wall portion along a predetermined inserting direction. With the inner and outer block members assembled together, a water jacket is defined between the outer circumferential surface and the inner circumferential surface and the first sealing surface is opposed to the second sealing surface below the water jacket. The liquid gasket is provided between the opposed first and second sealing surfaces. The restricting portion is formed in at least one of the first and second sealing surfaces. When the cylinder liner portion is inserted into the space defined by the cylinder outer wall portion, the restricting portion prevents the gasket from escaping from the clearance between the first and second sealing surfaces.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A divided type cylinder block 10 of a water-cooled engine 18 according to an embodiment of the present invention will now be described with reference to FIGS. 1 and 2.

Figure 1A:
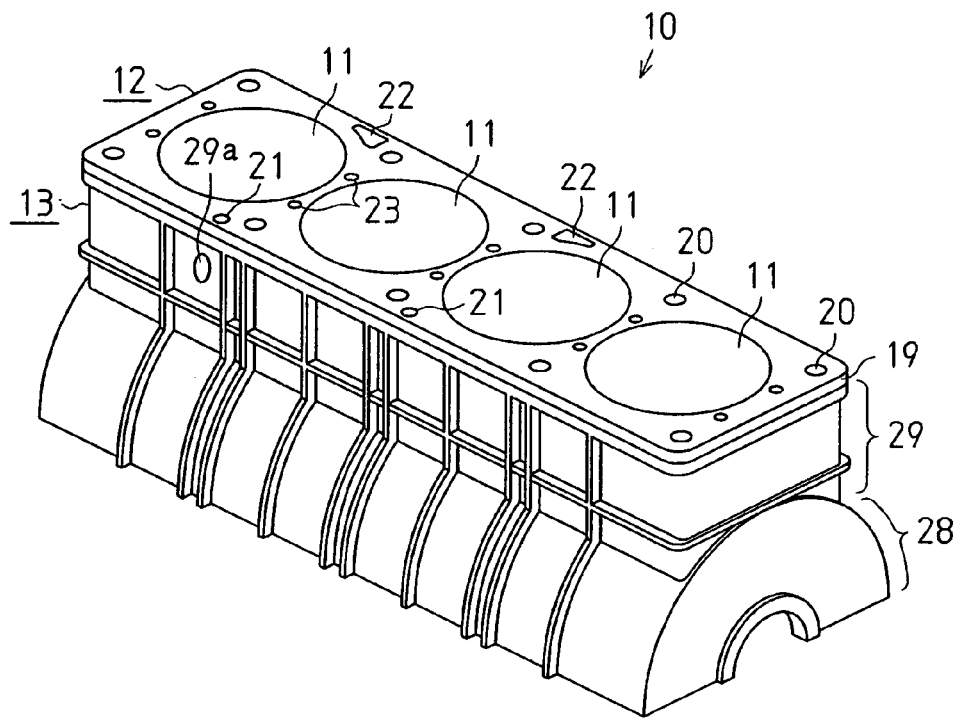
FIG. 1(a) is a perspective view showing a divided type cylinder block according to one embodiment of the present invention.
Figure 1B:
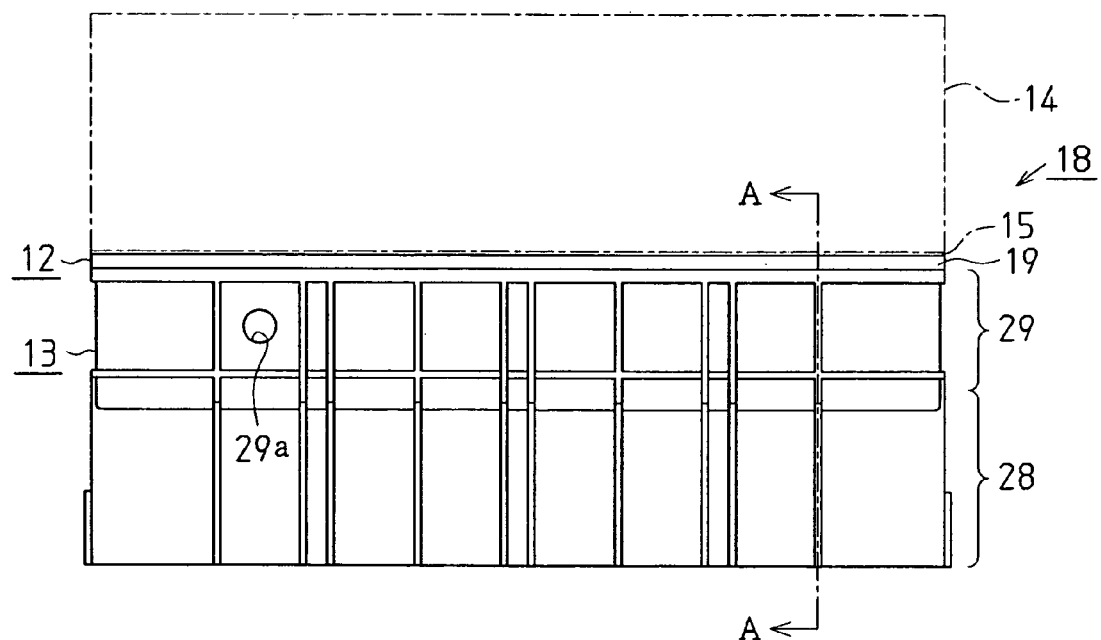
FIG. 1(b) is a front view showing the cylinder block of FIG. 1(a)
Figure 2:
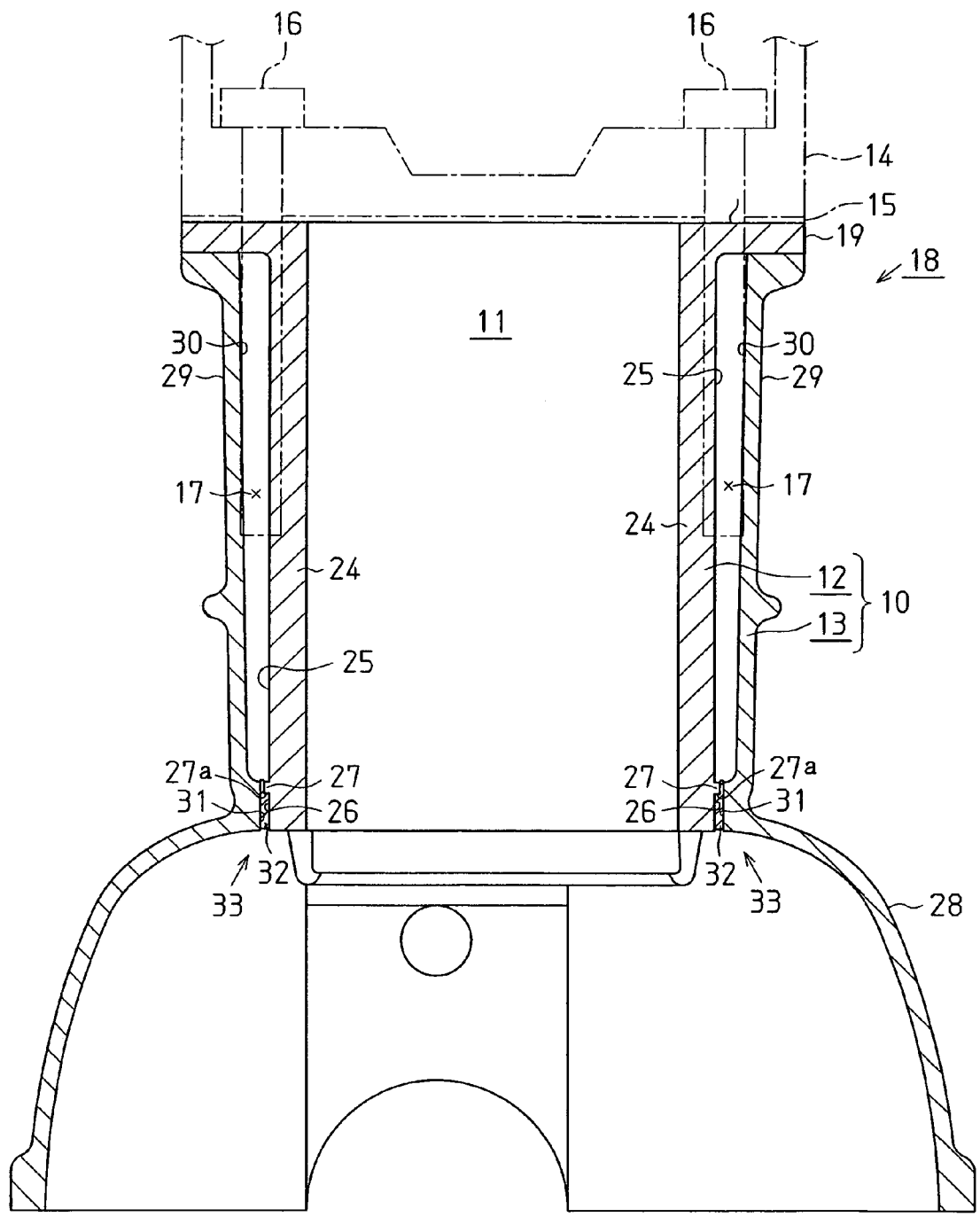
FIG. 2 is a cross-sectional view taken along line A—A of FIG. 1(b)

As shown in FIGS. 1(a), 1(b), and 2, the cylinder block 10 has a divided structure including an inner block member 12 and an outer block member 13. Four cylinder bores 11 are defined in the inner block member 12. The inner block member 12 is inserted into the outer block member 13 from above for assembling the block members 12, 13 together. With the inner block member 12 assembled with the outer block member 13, a water jacket 17 is defined around the cylinder bores 11 for circulating coolant. A cylinder head 14 is mounted on the inner block member 12 with a gasket 15 deployed between the cylinder head 14 and the inner block member 12. By fastening the cylinder head 14 to the cylinder block 10 securely by bolts 16, the body of the water-cooled engine 18 is completed.

An upper deck portion 19 is formed in an upper portion of the inner block member 12, such that the cylinder head 14 sits on the upper deck portion 19. The upper deck portion 19 has bolt holes 20 through which the bolts 16 are passed, as well as oil holes 21, blowby gas holes 22, and coolant holes 23. A cylinder liner portion 24 is formed beneath the upper deck portion 19 and shaped like four continuously formed cylinders, each of which defines the corresponding cylinder bore 11. An outer circumferential surface 25 of the cylinder liner portion 24 defines an inner wall of the water jacket 17.

A crankcase 28 is formed beneath the outer block member 13 and has a substantial skirt-like shape as viewed from a side. A cylinder outer wall portion 29 extends upward from the crankcase 28. The cylinder outer wall portion 29 has an inner circumferential surface 30 shaped in correspondence with the outer circumferential surface 25 of the cylinder liner portion 24. The inner circumferential surface 30 of the cylinder outer wall portion 29 is opposed to and spaced from the outer circumferential surface 25 of the cylinder liner portion 24 at a predetermined interval. The inner circumferential surface 30 defines an outer wall of the water jacket 17. A coolant port 29a is defined in a side wall of the cylinder outer wall portion 29 and communicated with the water jacket 17. Although not illustrated, bolt fastening holes, oil passages, and blowby gas passages are defined in an upper end portion of the cylinder outer wall portion 29 respectively at positions corresponding to the bolt holes 20, the oil holes 21, and the blowby gas holes 22, which are defined in the upper deck portion 19.

Referring to FIG. 2, a sealing structure 33 using a liquid gasket 32 is arranged between a lower end portion of the outer circumferential surface 25 of the cylinder liner portion 24 and a lower end portion of the inner circumferential surface 30 of the cylinder outer wall portion 29. That is, the lower end portion of the outer circumferential surface 25 defines a first sealing surface 26, and the lower end portion of the inner circumferential surface 30 defines a second sealing surface 31. The second sealing surface 31 is projected inward with respect to the remainder of the inner circumferential surface 30, or the portion of the inner circumferential surface 30 defining the outer wall of the water jacket 17. When the inner block member 12 is inserted into and assembled with the outer block member 13, the sealing surfaces 26, 31 are opposed to each other with the gasket 32 arranged between the sealing surfaces 26, 31. The water jacket 17 is located above the sealing structure 33.

A continuous projection 27 is formed in an upper portion of the first sealing surface 26. The continuous projection 27 is formed into a loop and functions as a restricting portion for preventing the gasket 32 from being displaced to a trailing side with respect to the inserting direction of the cylinder liner portion 24. The continuous projection 27 has a rectangular cross-sectional shape. A lower surface 27a of the projection 27 functions as a restricting surface for preventing the gasket 32 from being displaced along the first sealing surface 26 to a trailing side with respect to the inserting direction.

Before assembling the cylinder block 10, the liquid gasket 32 is applied to the first sealing surface 26 of the cylinder liner portion 24, which is the portion of the outer circumferential surface 25 extending downward from the projection 27. The cylinder liner portion 24 is then inserted into the space defined by the cylinder outer wall portion 29 from above the cylinder outer wall portion 29 along the axes of the cylinder bores 11. The block members 12, 13 are thus assembled together. During assembly, the first sealing surface 26 of the cylinder liner portion 24 and the second sealing surface 31 of the cylinder outer wall portion 29 are moved relative to each other along the inserting direction, while located close to each other. The gasket 32 thus receives shearing force from the sealing surfaces 26, 31, which are moved relative to each other. Therefore, the liquid gasket 32 applied to the first sealing surface 26 is adhered to the second sealing surface 31. The second sealing surface 31 thus drags the gasket 32 to the trailing side with respect to the inserting (moving) direction of the cylinder liner portion 24.

At this stage, the projection 27 of the first sealing surface 26 receives the gasket 32 and prevents the gasket 32 from being displaced from the first sealing surface 26. Accordingly, the clearance between the sealing surfaces 26, 31 is filled with a sufficient amount of the liquid gasket 32, such that the liquid gasket 32 seals the clearance reliably.

If the first sealing surface 26 does not include the projection 27, the second sealing surface 31 causes the gasket 32 to be smeared beyond the first sealing surface 26 to the remainder of the outer circumferential surface 25. The gasket 32 is thus sheared between the sealing surfaces 26, 31. As a result, a gap can be defined between the sealing surfaces 26, 31, lowering the sealing performance of the clearance.

The illustrated embodiment has the following advantages.

(1) The projection 27 is projected from the first sealing surface 26 of the cylinder liner portion 24. When the inner block member 12 is inserted into the outer block member 13, the projection 27 prevents the gasket 32 applied to the first sealing surface 26 from being displaced to a trailing side on the cylinder liner portion 24 with respect to the inserting direction. This enables the first and second sealing surfaces 26, 31 to be opposed to each other with the clearance between the sealing surfaces 26, 31 filled sufficiently with the gasket 32. The clearance is thus reliably sealed.

(2) The projection 27 has a rectangular cross-sectional shape. The lower surface 27a of the projection 27 functions as the restricting surface for restricting displacement of the gasket 32. The lower surface 27a is faced in the inserting direction of the cylinder liner portion 24 and extends perpendicular to this direction. The lower surface 27a thus receives the gasket 32 effectively, restricting the displacement of the gasket 32 reliably.

The illustrated embodiment may be modified as follows.

Figure 3A:
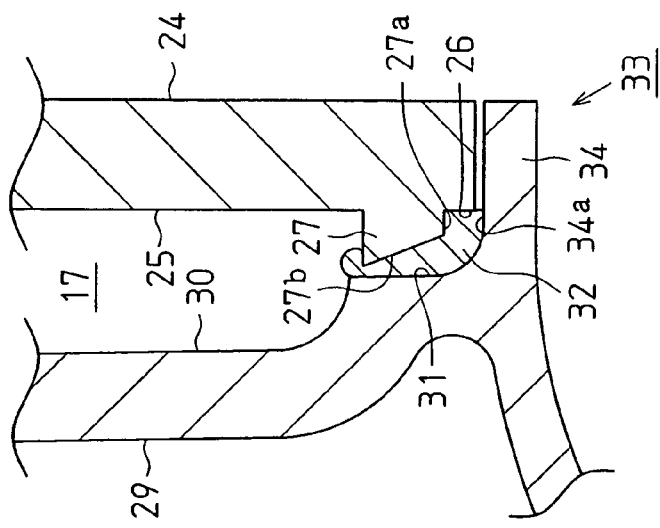
FIGS. 3(a) to 3(c) are partially enlarged cross-sectional views each showing a modification of the divided type cylinder block.

Referring to FIG. 3(a), a projection 34 may be formed on a lower portion of the second sealing surface 31 for receiving the gasket 32. The projection 34 prevents the gasket 32 from being displaced to an advancing side with respect to the inserting direction of the cylinder liner portion 24. The projection 34 has an upper surface 34a functioning as a restricting surface for preventing the gasket 32 from being displaced to an advancing side with respect to the inserting direction. The upper surface 34a is faced in the opposite direction of the inserting direction of the cylinder liner portion 24 and extends perpendicular to this direction. Accordingly, when the inner block member 12 is inserted into the outer block member 13, the gasket 32 is reliably prevented from being displaced in the inserting direction of the cylinder liner portion 24. The sealing performance of the gasket 32 is thus further improved.

Figure 3B:
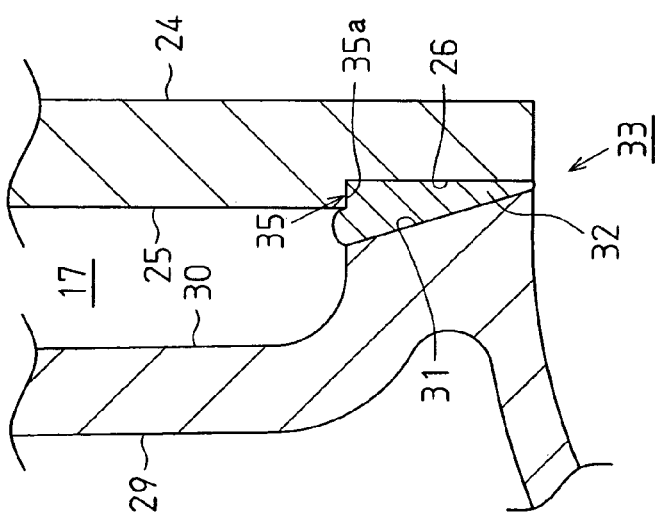

As shown in FIG. 3(b), the second sealing surface 31 may be slanted with respect to the inserting direction of the cylinder liner portion 24, such that the clearance between the first and second sealing surfaces 26, 31 is gradually reduced along the inserting direction of the cylinder liner portion 24. In this case, the second sealing surface 31 functions as a restricting surface for preventing the gasket 32 from being displaced to an advancing side with respect to the inserting direction of the cylinder liner portion 24.

With reference to FIG. 3(b), the first sealing surface 26 may be arranged radially inward from the outer circumferential surface 25 of the cylinder liner portion 24. This arrangement defines a step 35 between the first sealing surface 26 and the outer circumferential surface 25. The step 35 functions as a restricting portion. A lower surface 35a of the step 35 functions as a restricting surface, like the lower surface 27a of the projection 27, which is shown in FIG. 2.

The sealing structure of FIG. 3(b) may be modified as follows. More specifically, the first sealing surface 26 may be slanted with respect to the inserting direction of the cylinder liner portion 24, such that the clearance between the first and second sealing surfaces 26, 31 is gradually reduced along the opposite direction of the inserting direction of the cylinder liner portion 24. Further, a step with an upper surface faced in the opposite direction of the inserting direction of the cylinder liner portion 24 may be formed at a lower end of the second sealing surface 31.

Figure 3C:
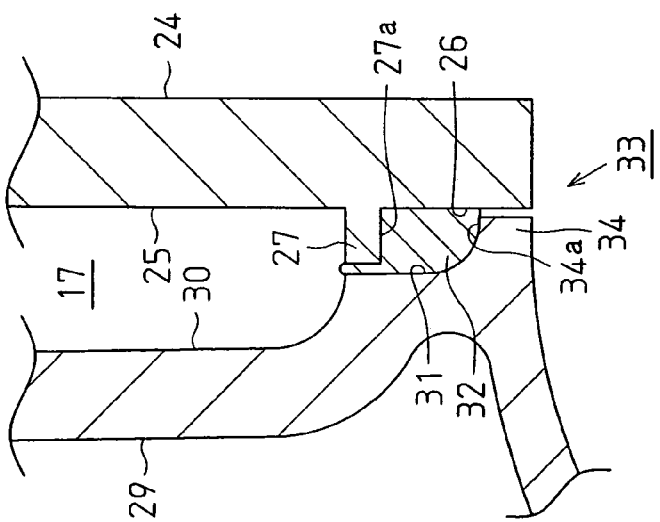

Referring to FIG. 3(c), the projection 34 of FIG. 3(a) may be projected along the lower end of the cylinder liner portion 24. In this case, the upper surface 34a of the projection 34 is elongated, thus restricting displacement of the gasket 32 further reliably.

As shown also in FIG. 3(c), the projection 27 of the cylinder liner portion 24 may be elongated in the inserting direction of the cylinder liner portion 24, while a distal surface 27b of the projection 27 opposed to the second sealing surface 31 is formed in a slanted manner. More specifically, the distal surface 27b is slanted with respect to the inserting direction of the cylinder liner portion 24, such that the clearance between the distal surface 27b and the second sealing surface 31 is gradually reduced in the opposite direction of the inserting direction of the cylinder liner portion 24.

Further, when inserting the cylinder liner portion 24 into the space defined by the cylinder outer wall portion 29, the inner block member 12 may be moved relative to the outer block member 13 held in a fixed state or the outer block member 13 may be moved relative to the inner block member 12 held in a fixed state. Alternatively, the block members 12, 13 may be each moved relative to each other. Further, in the above description, "the inserting direction of the cylinder liner portion 24" indicates the displacement direction of the cylinder liner portion 24 with respect to the cylinder outer wall portion 29, regardless of which of the block members 12, 13 is moved.

The present examples and embodiments are to be considered as illustrative and not restrictive and the invention is not to be limited to the details given herein, but may be modified within the scope and equivalence of the appended claims.

The invention claimed is:

1. A divided type cylinder block comprising:
an inner block member having a cylinder liner portion defining a cylinder bore, the cylinder liner portion including an outer circumferential surface and a first sealing surface formed at a predetermined position of the outer circumferential surface;
an outer block member having a cylinder outer wall portion, the cylinder outer wall portion including an inner circumferential surface and a second sealing surface formed at a predetermined position of the inner circumferential surface, wherein the inner block member is assembled with the outer block member by inserting the cylinder liner portion into the space defined by the cylinder outer wall portion along a predetermined inserting direction, and wherein, with the inner and outer block members assembled together, a water jacket is defined between the outer circumferential surface and the inner circumferential surface and the first sealing surface is opposed to the second sealing surface below the water jacket;

a liquid gasket provided between the opposed first and second sealing surfaces; and a restricting portion formed in the first sealing surface, wherein, when the cylinder liner portion is inserted into the space defined by the cylinder outer wall portion, the restricting portion prevents the gasket from being displaced to a trailing side on the cylinder liner portion with respect to the inserting direction, wherein the restricting portion includes a slanted surface slanted with respect to the inserting direction of the cylinder liner portion.

2. The cylinder block according to claim 1, wherein the restricting surface is slanted such that the clearance between the slanted surface and the second sealing surface is gradually reduced in the opposite direction of the inserting direction of the cylinder liner portion.

3. A divided type cylinder block comprising:

an inner block member having a cylinder liner portion defining a cylinder bore, the cylinder liner portion including an outer circumferential surface and a first sealing surface formed at a predetermined position of the outer circumferential surface;

an outer block member having a cylinder outer wall portion, the cylinder outer wall portion including an inner circumferential surface and a second sealing surface formed at a predetermined position of the inner circumferential surface, wherein the inner block member is assembled with the outer block member by inserting the cylinder liner portion into the space defined by the cylinder outer wall portion along a predetermined inserting direction, and wherein, with the inner and outer block members assembled together, a water jacket is defined between the outer circumferential surface and the inner circumferential surface and the first sealing surface is opposed to the second sealing surface below the water jacket;

a liquid gasket provided between the opposed first and second sealing surfaces;

a first restricting portion formed in the first sealing surface, wherein, when the cylinder liner portion is inserted into the space defined by the cylinder outer wall portion, the first restricting portion prevents the gasket from being displaced to a trailing side on the cylinder liner portion with respect to the inserting direction, and a second restricting portion formed in the second sealing surface, and wherein, when the cylinder liner portion is inserted into the space defined by the cylinder outer wall portion, the second restricting portion prevents the gasket from being displaced to an advancing side with respect to the inserting direction of the cylinder liner portion, wherein the first restricting portion and the second restricting portion are formed at different positions with respect to the inserting direction of the cylinder liner portion.

4. A divided type cylinder block comprising:

an inner block member having a cylinder liner portion defining a cylinder bore, the cylinder liner portion including an outer circumferential surface and a first sealing surface formed at a predetermined position of the outer circumferential surface;

an outer block member having a cylinder outer wall portion, the cylinder outer wall portion including an inner circumferential surface and a second sealing surface formed at a predetermined position of the inner circumferential surface, wherein the inner block member is assembled with the outer block member by inserting the cylinder liner portion into the space defined by the cylinder outer wall portion along a predetermined inserting direction, and wherein, with the inner and outer block members assembled together, a water jacket is defined between the outer circumferential surface and the inner circumferential surface and the first sealing surface is opposed to the second sealing surface below the water jacket;

a liquid gasket provided between the opposed first and second sealing surfaces;

a first restricting portion formed in the first sealing surface, wherein, when the cylinder liner portion is inserted into the space defined by the cylinder outer wall portion, the first restricting portion prevents the gasket from being displaced to a trailing side on the cylinder liner portion with respect to the inserting direction; and a second restricting portion formed in the second sealing surface, wherein, when the cylinder liner portion is inserted into the space defined by the cylinder outer wall portion, the second restricting portion prevents the gasket from being displaced to an advancing side with respect to the inserting direction of the cylinder liner portion, and wherein the second restricting portion has a second restricting surface faced in the opposite direction of the inserting direction of the cylinder liner portion.

5. The cylinder block according to claim 4, wherein the second restricting portion includes a projection or a step.

6. The cylinder block according to claim 4, wherein the second restricting surface extends substantially perpendicular to the inserting direction of the cylinder liner portion.

7. A divided type cylinder block comprising:

an inner block member having a cylinder liner portion defining a cylinder bore, the cylinder liner portion including an outer circumferential surface and a first sealing surface formed at a predetermined position of the outer circumferential surface;

an outer block member having a cylinder outer wall portion, the cylinder outer wall portion including an inner circumferential surface and a second sealing surface formed at a predetermined position of the inner circumferential surface, wherein the inner block member is assembled with the outer block member by inserting the cylinder liner portion into the space defined by the cylinder outer wall portion along a predetermined inserting direction, and wherein, with the inner and outer block members assembled together, a water jacket is defined between the outer circumferential surface and the inner circumferential surface and the first sealing surface is opposed to the second sealing surface below the water jacket;

a liquid gasket provided between the opposed first and second sealing surfaces;

a first restricting portion formed in the first sealing surface, wherein, when the cylinder liner portion is inserted into the space defined by the cylinder outer wall portion, the first restricting portion prevents the gasket from being displaced to a trailing side on the cylinder liner portion with respect to the inserting direction; and a second restricting portion formed in the second sealing surface, wherein, when the cylinder liner portion is inserted into the space defined by the cylinder outer wall portion, the second restricting portion prevents the gasket from being displaced to an advancing side with respect to the inserting direction of the cylinder liner portion, and wherein the second restricting portion includes a second slanted surface slanted with respect to the inserting direction of the cylinder liner portion.

8. The cylinder block according to claim 7, wherein the second slanted surface is slanted such that the clearance between the second slanted surface and the first sealing surface is gradually reduced along the inserting direction of the cylinder liner portion.

* * * * *